Aug. 12, 1958　　　L. F. MAULDIN　　　2,846,934
CABIN PRESSURE OUTFLOW VALVE

Filed Aug. 10, 1953　　　2 Sheets-Sheet 1

Lloyd F. Mauldin
INVENTOR.

BY

Attorney

Aug. 12, 1958 — L. F. MAULDIN — 2,846,934
CABIN PRESSURE OUTFLOW VALVE
Filed Aug. 10, 1953 — 2 Sheets-Sheet 2

Lloyd F. Mauldin
INVENTOR.
BY
Attorney

United States Patent Office 2,846,934
Patented Aug. 12, 1958

2,846,934
CABIN PRESSURE OUTFLOW VALVE

Lloyd F. Mauldin, Los Angeles, Calif., assignor to The Garrett Corporation, Los Angeles, Calif., a corporation of California Application August 10, 1953, Serial No. 373,381

9 Claims. (Cl. 98—1.5)

This invention relates generally to pressure regulating or control means and relates more particularly to means or mechanism for controlling the pressure in an enclosure.

While the invention has particular utility in connection with pressurized ventilation of enclosures such as aircraft cabins and the like, and is shown and described embodied in such installations, it is to be understood that its utility is not confined thereto, and it is to be understood that the term "aircraft" as used herein refers to any type of device that travels through the earth's atmosphere or above. Generally, in cabin pressurizing and ventilating systems, there is means, such as an air pump or supercharger or the like for supplying air under pressure to the cabin, with one or more valves for controlling the outflow of air from a discharge or outlet duct or ducts.

The pressurizing of the cabin is for the purpose of providing adequate air supply under sufficient pressure to prevent discomfort or injury to the occupants of the cabin.

It is an object of the invention to provide pressure regulating apparatus which will permit the use of control mechanisms containing relatively small metering valves to control outflow valves which have a large capacity.

Another object of the invention is to provide apparatus of this character that is light in weight, compact, and capable of handling a large flow of air.

Still another object of the invention is to provide apparatus of this character capable of modulation as effected by pressure signals generated by a standard outflow valve control.

A further object of the invention is to provide mechanism of this character whereby changes in regulator head pressure will be magnified to effect rapid changes in pressure in the head of the outflow valve.

A still further object of the invention is to provide mechanism of this character whereby rapid changes in the outflow valve head pressure will be effected in response to increasing changes in regulator head pressure so that said outflow valve will be controlled in such a manner as to control cabin pressure and cause the latter to follow regulator head pressure.

Another object of the invention is to provide pneumatic relay means whereby the foregoing objects will be effected.

Other objects and advantages of the invention will be apparent from the following part of the specification.

Referring to the drawings, which are for illustrative purposes only;

Figure 1:
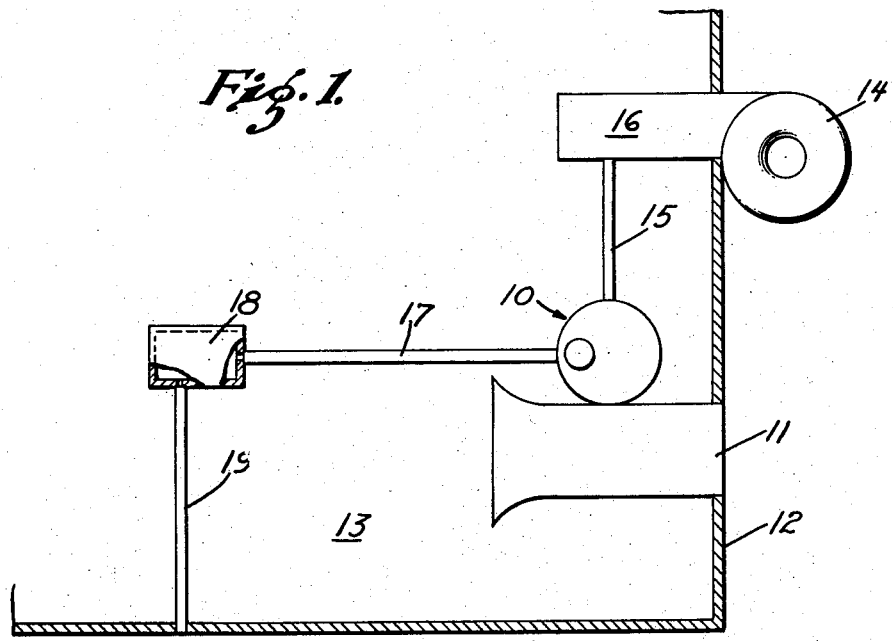
Fig. 1 is a diagrammatic or schematic view of a pressure control apparatus or system embodying the present invention and installed in an aircraft cabin.
Figure 2:
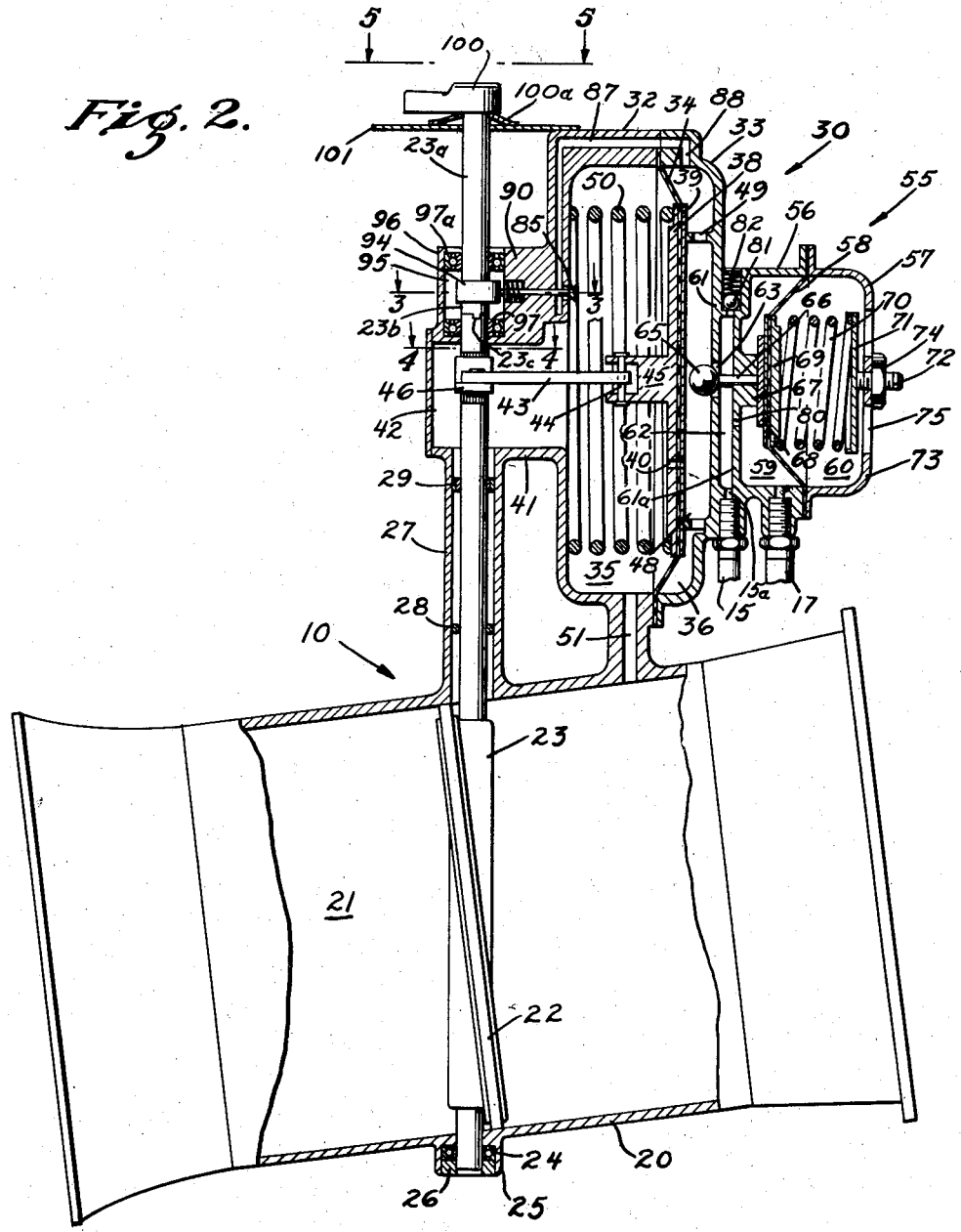
Fig. 2 is an enlarged sectional view through the outflow valve and associated control mechanism.

Referring to Fig. 1, the present regulating system includes an outflow valve and actuating mechanism therefor, indicated generally at 10, which is adapted to control the outflow of air through an outlet 11 in a wall 12 of the aircraft cabin 13 which is supplied with air under pressure by any suitable means such as a supercharger 14. The outflow valve actuating mechanism has a connection 15 with a source of higher pressure which, as shown, is the supercharger outlet 16. The actuating mechanism also has a connection 17 with a control device 18, said control device 18 having a control pressure chamber, not shown, with which the conduit 17 is connected. The control device 18 is also connected with ambient atmosphere by conduit 19. The control mechanism 18 may be of any suitable type such as is shown, for example, in the Kemper Patent No. 2,513,332 or the Arthur et al. Patent No. 2,531,100. Referring more particularly to Fig. 2, the unit 10 includes a conduit 20 defining an air passage 21 for the outflow of air from the cabin to atmosphere. Passage 21 is controlled by a valve shown as a butterfly valve 22 mounted on a valve shaft 23. The shaft 23 extends substantially diametrically of the passage 21 and has one end rotatably mounted in a bearing 24 received in a recess formed by a laterally extending annular wall 25, there being a suitable seal 26 in said recess.

Diametrically opposite the annular wall 25 is a tubular housing 27 through which the opposite end portion of the shaft 23 extends, said extension 27 having sealing means 28 and 29 therein for preventing the flow of air past the shaft 23.

The actuating mechanism for the shaft 23, and hence the valve 22, is indicated generally at 30 and includes a housing formed of two sections, 32 and 33 respectively. These sections are generally cup-shaped with their rim portions facing each other and clamping therebetween a marginal portion of a flexible diaphragm 34 which separates the interior of said housing into a low pressure chamber 35 and a high pressure chamber 36. The housing sections 32 and 33 are secured together by any suitable means such as screws, not shown. A central area of the diaphragm 34 is clamped between a pair of plates 38 and 39 which are of smaller diameter than the interior diameter of the housing and which reenforce said central area of diaphragm 34. A restricted connection is provided between chambers 35 and 36 and comprises a bleed opening 40 through the plates 38 and 39 and the diaphragm 34 to permit a limited flow of air between said chambers.

Housing section 32 has an axial extension 41 defining a recess 42 for reception of a valve actuating link 43. Link 43 has one end pivotally connected to a pin 44 which extends between the bifurcated ends of a boss 45 formed integrally with the plate 38. Link 43 has its opposite end operatively connected to the free end of a lever 46 (Figs. 2 and 4) attached to the adjacent portion of shaft 23 which extends through the recess 42. Thus movements of the diaphragm 34 effect corresponding movements of the butterfly valve 22. Within the chamber 36 is an annular member 48, shown as formed integrally with the housing section 33, which forms a seat for the plate 39 and, therefore, a stop for movement of the diaphragm 34 to the right, as shown in Fig. 2. The member 48 is provided with a plurality of openings 49 to assure even application of the high pressure air over the entire surface of the diaphragm. A spring 50, disposed in chamber 35, urges the diaphragm toward the stop 48 which is in a direction for effecting closing movement of the valve 22.

Chamber 35 has a connection, by way of duct 51, with the atmospheric side of the butterfly valve 22 where a relatively low pressure prevails.

Means for controlling the operation of the diaphragm 34 is provided and comprises the mechanism indicated generally at 55. This mechanism comprises a housing formed of hollow, generally cup-shaped, sections 56 and 57 which have their rim portions facing each other. The rim portions of said sections 56 and 57 marginally clamp therebetween a flexible diaphragm 58 so as to form a pair of chambers 59 and 60 on opposite sides of said diaphragm 58.

A wall 61 separates chamber 36 from a plenum chamber 62 which is connected with said chamber 36 by an axial opening 63 in said wall 61. The other side of chamber 62 is defined by a wall 61a. Chamber 62 is connected by means of the conduit 15 and an orifice 15a with the supercharger outlet 16 so that under superatmospheric pressure, air may be provided to chamber 36 under the control of a valve member 65 which controls the flow through the passage 63. Valve member 65 is provided with a valve stem 66 slidably received in an opening provided in a boss 67 which extends from wall 61 into chamber 59, stem 66 being connected to a plate member 68 on one side of diaphragm 58; the opposite side of said diaphragm is provided with a plate 69 and said plates 68 and 69 clamp a central area of the diaphragm therebetween. Valve member 65 is urged in the opening direction by a spring 70 disposed in the chamber 60 and reacting between plate 69 and a spring retainer 71 adjustably secured to a screw 72 which extends outwardly of the bottom wall 73 of the housing section 57. A nut 74 secures the screw 72 in adjusted positions and said bottom wall 73 is provided with openings 75 to allow unrestricted entry of enclosure air into said chamber 60 so that the pressure of air in said chamber 60 is the same as the pressure of the air in the enclosure. Spring 70 urges the diaphragm against the inner end of the boss 67 and, hence, urges the valve 65 in the opening direction. Valve member 65, due to its connection to plate 68 through stem 66, moves in the closing direction when diaphragm 58 moves to the right.

Chamber 59 is connected to the chamber 62 by means of a bleed opening 80. This chamber is also connected to the control chamber of the control device 18 by the conduit 17. The pressure in chamber 62 is maintained at a uniform value by a pressure relief valve 81 which controls the end of said chamber opposite the conduit 15. Valve 81 is urged in the closing direction by a spring of suitable character indicated at 82.

Figures 3, 4:
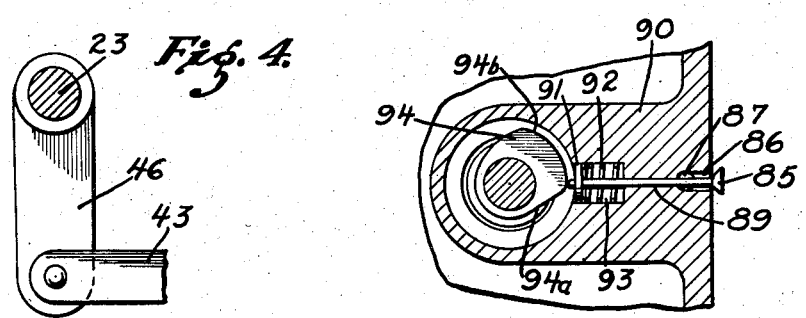
Fig. 3 is an enlarged sectional view taken on line 3—3 of Fig. 2.
Fig. 4 is an enlarged fragmentary view taken on line 4—4 of Fig. 2.
Figure 5:
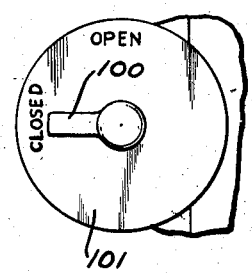
Fig. 5 is a plan view of the manual control lever and associated dial as viewed from line 5—5 of Fig. 2.

A manual override control is provided and includes a relief valve 85, Figs. 2 and 3, which controls a connection between the chambers 35 and 36, said connection including a passage 86, duct 87 in the housing section 32 and duct 88 in the housing section 33. Valve 85 has a stem 89 slidably received in a bore provided therefor in a boss 90 formed integrally with the bottom of the housing secion 32. The end of the stem 89 opposite the valve member 85 is provided with a washer 91 secured to said stem by any suitable means and a spring 92 is operably received in a recess 93 in said boss 90. Spring 92 reacts between the bottom of the recess 93 and the washer 91 for urging the valve member 85 in the closing direction. The valve member 85 is moved in the opening direction by a cam 94 secured to a shaft 23a axially aligned with the shaft 23, said cam being disposed in a chamber 95 formed in the boss 90 and closed by a plate 96. The cam 94, as best shown in Fig. 3, has a surface 94a for effecting rapid movement of the valve 85, the part 94a extending about 5°. There is also an approximately 90° dwell portion 94b which maintains the valve 85 in the open position when engaging stem 89 of said valve.

At the bottom of recess 95 there is a bearing 97 for the upper end of the shaft 23. Shaft 23a extends outwardly of the boss 90 and is provided with a bearing 97a which is disposed within said recess 95. The upper end of shaft 23a is provided with an actuating handle 100 disposed adjacent to a dial 101 attached to the housing section 32 or to any other convenient support and shafts 23 and 23a are adapted to be connected by a clutch, indicated generally at 23b, which may be of any suitable character but is shown as a tongue 23c on the lower end of shaft 23a adapted to be received in a groove provided therefor in the adjacent end of shaft 23. A spring 100a which reacts between the dial plate 100 and handle 101 urges the shaft 23a upwardly, as shown in Fig. 2, to disconnect the clutch 23b. Engagement of the cam 94 with the bearing 97a limits upward movement of said shaft 23a.

The control unit 18 may have various types of control devices therein for providing various types of controls. In the arrangement shown in the Arthur et al. Patent No. 2,531,100 there is shown an absolute pressure responsive device for maintaining a substantially constant pressure in the control pressure chamber and a differential pressure responsive device for maintaining a differential pressure between that in the control pressure chamber and ambient atmosphere in a range of operation above the isobaric range. The control pressure chamber is connected with a source of higher pressure and a region of lower pressure and in the present mechanism this source of higher pressure is the supercharger outlet and the pressure of said outlet is transmitted through the conduit 15, chamber 62, bleed 80, chamber 59 and conduit 17. The outlet connection for said control pressure chamber comprises the conduit 19. With the present arrangement the pressure in the chamber 59 is substantially the same as the pressure in the control pressure chamber of the control device 18 and the relay mechanism 55 operates in accordance with the differential of pressure in said chamber 59 and the chamber 60. Controlled pressure from the supercharger is transmitted from the chamber 62 through the passage 63 into the chamber 36, said pressure being controlled by the valve 65 which, in turn, is controlled by the position of the diaphragm 58 of the relay device 55. Diaphragm 34 is positioned in accordance with the differential of pressure in chambers 35 and 36, the pressure in said chamber 35 being substantially ambient atmospheric pressure. Pressure in the chamber 36 may be termed the operating pressure and movement of the diaphragm 34 will effect corresponding movement of the valve 22 so as to maintain the enclosure or cabin pressure at the desired value.

More specifically, let it be assumed that the aircraft is operating in the isobaric range and the control pressure in chamber 59 is maintained at a substantially constant value. Should the pressure in the enclosure rise above the desired value, the diaphragm 58 will be moved to the left, as shown in Fig. 2, to increase the opening of the pilot valve 65 which controls the transmission of pressure through the passage 63 to the operating pressure chamber 36. Diaphragm 34 will then be moved to the left, as shown in Fig. 2, to increase the opening of the outflow valve 22 and, thereby, effect an increase in the outflow of air from the enclosure and reduce the pressure therein to the desired value.

On the other hand, should enclosure pressure drop below the predetermined value, the diaphragm 58 of the relay mechanism 55 will move to the right, as shown in Fig. 2, to reduce the transmission of pressure through the passage 63 to the operating pressure chamber 36. Diaphragm 34 will then move to the right and move valve 22 in the closing direction so that there will be a pressure build-up in the enclosure to the desired value.

When the aircraft reaches the upper limit of the isobaric range, the differential pressure responsive device of the control mechanism 18 will take over and maintain the pressure in chamber 59 in accordance with the predetermined fixed differential pressure between that in said chamber and ambient atmospheric pressure. This will result in the maintenance of the enclosure pressure at the desired differential with respect to ambient atmospheric pressure.

Should it be desired to manually override the pneumatic mechanism of the outflow valve, handle 100 is moved downwardly, as shown in Fig. 2, to effect engagement of the shafts 23a and 23 by means of the clutch 23b. The handle is then moved to actuate the valve 22 in the closing direction and effect opening of the relief valve 85 by the cam 94 so that the chambers 35 and 36 are interconnected pneumatically. This substantially equalizes the pressure across the diaphragm 34 so that closing movement of the handle 100 will not force the operator to work against the high pressure in the chamber 36. Under these conditions both the valves 65 and 81 are pneumatically positioned.

When the manual override handle or lever 100 is actuated to move the valve 22 in the opening direction, the valve 85 is closed due to the moving away of the cam from the adjacent end of the valve stem 89. The valves 65 and 81 are still pneumatically positioned. It is to be noted that the position of the handle or lever 100 with respect to the dial 101 makes ready determination of the position of the outflow valve 22 possible, said dial having a position marked "closed" and a position marked "open" and the handle 100 moves between these positions with movements of said valve 22.

I claim:

1. A pressure control mechanism for controlling the pressure in an enclosure supplied with air from a source of air under pressure, and having an outlet, comprising: an outflow valve controlling said outlet; outflow valve control means including a pressure sensitive valve actuating element connected to the outflow control valve; means defining a pair of pressure chambers on opposite sides of said pressure sensitive element, there being bleed means between said chambers; means defining a passageway connecting one of said chambers with a region of relatively low pressure, the other of said chambers being an operating pressure chamber, the pressure in said operating pressure chamber urging said element in the valve opening direction; yielding means urging said pressure sensitive element in the valve closing direction; stop means limiting movement of said pressure sensitive element in the valve closing direction; means defining a plenum chamber having a connection with said operating pressure chamber; means defining a high pressure passageway connecting the plenum chamber with said source of air under pressure; pressure relief means limiting the pressure of the air in said plenum chamber; pneumatic relay means including a pilot valve controlling the flow of air from said plenum chamber to said operating pressure chamber; a pressure responsive member for controlling said pilot valve; means defining a relay control pressure chamber on one side of said pressure responsive member and an enclosure pressure chamber at the opposite side of said member; means defining a bleed from said plenum chamber to said control pressure chamber, the pressure in said control pressure chamber urging the pressure responsive member in the pilot valve closing direction, the chamber on the opposite side of said pressure responsive member being open to enclosure pressure; yielding means urging said pressure responsive member in the pilot valve opening direction; stop means limiting movement of said pressure responsive means in said pilot valve opening direction; means for controlling the pressure in said control pressure chamber, said means having a control pressure chamber; means interconnecting said control pressure chambers; means connecting the control pressure chamber of the control device with ambient atmosphere; passage means interconnecting the first mentioned chamber and the operating pressure chamber; a manually operable relief valve controlling said passageway; releasable means for manually actuating the outflow valve; means for effecting opening of said manually operable relief valve by actuation of said manual means in the closing direction of the outflow valve; and dial and indicator means for indicating the position of the outflow valve.

2. In pressure control mechanism for controlling the pressure in an enclosure supplied with air from a source of air under pressure, and having an outlet: an outflow valve controlling said outlet; outflow valve actuating means including a pressure sensitive valve actuating element connected to the outflow valve; means defining a pair of pressure chambers on opposite sides of said pressure sensitive element, there being bleed means between said chambers; means defining a passageway connecting one of said chambers with a region of relatively low pressure, the other of said chambers being an operating pressure chamber, the pressure in said operating pressure chamber urging said element in the valve opening direction; yielding means urging said pressure sensitive element to the valve closing direction; stop means limiting movement of said pressure sensitive element in the valve closing direction; a plenum chamber; means defining a high pressure passage connecting the plenum chamber with said source of air under pressure; pressure relief means limiting the pressure of the air in said plenum chamber; pneumatic relay means including a plot valve controlling the flow of said high pressure air to said operating pressure chamber; a pressure responsive member for controlling said pilot valve; means defining a relay control pressure chamber on one side of said pressure responsive member and a chamber on the opposite side of said member; means defining a bleed from the plenum chamber to said relay control pressure chamber, the pressure in said control pressure chamber urging the pressure responsive member in the pilot valve closing direction, the chamber on the opposite side of said pressure responsive member being open to enclosure pressure; yielding means urging said pressure responsive member in the pilot valve opening direction; stop means limiting movement of said pressure responsive means in said pilot valve opening direction; means for controlling the pressure in said control pressure chamber, said means having a control pressure chamber; means interconnecting said control pressure chambers; means connecting the control pressure chamber of the control device with ambient atmosphere; and means for manually actuating the outflow valve.

3. In pressure control mechanism for controlling the pressure in an enclosure supplied with air from a source of air under pressure, and having an outlet: an outflow valve controlling said outlet; outflow valve actuating means including a pressure sensitive valve actuating element connected to the outflow control valve; means defining a pair of pressure chambers on opposite sides of said pressure sensitive element, there being bleed means between said chambers; means defining a passageway connecting one of said chambers with a region of relatively low pressure, the other of said chambers being an operating pressure chamber, the pressure in said operating pressure chamber urging said element in the valve opening direction; yielding means urging said pressure sensitive element in the valve closing direction; stop means limiting movement of said pressure sensitive element in the valve closing direction; means defining a plenum chamber connected with said source of air under pressure; pressure relief means limiting the pressure of the air in said plenum chamber; pneumatic relay means including a pilot valve controlling the flow of high pressure air from said plenum chamber to said operating pressure chamber; a pressure responsive member for controlling said pilot valve; means defining a relay control pressure chamber on one side of said pressure responsive member and a chamber at the opposite side of said member; means defining a bleed from the plenum chamber to said relay control pressure chamber, the pressure in said control pressure chamber urging the pressure responsive member in the pilot valve closing direction, the chamber on the opposite side of said pressure responsive member being open to enclosure pressure; yielding means urging said pressure responsive member in the pilot valve opening direction; stop means limiting movement of said pressure responsive means in said pilot valve opening direction; means for controlling the pressure in said control pressure chamber, said means also having a control pressure chamber; means interconnecting said control pressure chambers; and means connecting the control pressure chamber of the control device with ambient atmosphere.

4. In pressure control mechanism for controlling the pressure in an enclosure supplied with air from a source of air under pressure, and having an outlet: an outflow control valve controlling said outlet; outflow valve actuating means including a pressure sensitive valve actuating element connected to said outflow control valve; means defining a pair of pressure chambers on opposite sides of said pressure sensitive element, there being bleed means between said chambers; means defining a passageway connecting one of said chambers with a region of relatively low pressure, the other of said chambers being an operating pressure chamber, the pressure in said operating pressure chamber urging said element in the valve opening direction; yielding means urging said pressure sensitive element in the valve closing direction; stop means limiting movement of said pressure sensitive element in the valve closing direction; means defining a high pressure passage, including a plenum chamber, connecting the operating pressure chambers with said source of air under pressure to thereby provide said operating pressure chamber with high pressure air; pressure relief means limiting the pressure of the air supplied to said operating pressure chamber; pneumatic relay means including a pilot valve controlling the flow of air to said operating pressure chamber, and a pressure responsive member for controlling said pilot valve, said pressure responsive member being subjected to enclosure pressure on one side and to a control pressure on the opposite side; passage means interconnecting the first mentioned chamber and the operating pressure chamber; a manually operable relief valve controlling said passageway; releasable means for manually actuating the outflow valve; and means for effecting opening of said manually operable relief valve by actuation of said manual means in the outflow valve closing direction.

5. In pressure control mechanism for controlling the pressure in an enclosure supplied with air from a source of air under pressure, and having an outlet: an outflow control valve controlling said outlet; outflow valve actuating means including a pressure sensitive valve actuating element connected to said outflow control valve; means defining a pair of pressure chambers on opposite sides of said pressure sensitive element, there being bleed means between said chambers; means defining a passageway connecting one of said chambers with a region of relatively low pressure, the other of said chambers being an operating pressure chamber, the pressure in said operating pressure chamber urging said element in the valve opening direction; yielding means urging said pressure sensitive element in the valve closing direction; stop means limiting movement of said pressure sensitive element in the valve closing direction; means defining a high pressure passage connecting the operating pressure chamber with said source of air under pressure to thereby provide said operating pressure chamber with high pressure air; pressure relief means limiting the pressure of the air supplied to said operating pressure chamber; and pneumatic relay means including a pilot valve controlling the flow of air to said operating pressure chamber, and a pressure responsive member for controlling said pilot valve, said pressure responsive member being subjected to enclosure pressure on one side and to a control pressure on the opposite side.

6. In pressure control mechanism for controlling the pressure in an enclosure supplied with air from a source of air under pressure, and having an outlet: an outflow control valve controlling said outlet; outflow valve actuating means including a pressure sensitive valve actuating element connected to said outflow control valve, said pressure sensitive element being subjected on one side to a relatively low pressure, the other side of said element being subjected to a relatively high operating pressure derived from said source of air under pressure; relay means including a pilot valve controlling the flow of said relatively high pressure air to said other side of said element; a pressure responsive member for controlling said pilot valve; means defining a relay control pressure chamber on one side of said pressure responsive member and a chamber on the opposite side of said member; means defining a bleed for said relay control pressure chamber, said bleed connecting said relay control pressure chamber with said relatively high pressure source, the pressure in said control pressure chamber urging the pressure responsive member in the pilot valve closing direction, the chamber on the opposite side of said pressure responsive member being open to enclosure pressure; pneumatic means for controlling the pressure in said relay control pressure chamber, said pneumatic means being connected with said source of air under pressure; and manual override means for actuating the outflow valve.

7. In pressure control mechanism for controlling the pressure in an enclosure supplied with air from a source of air under pressure, and having an outlet: an outflow control valve controlling said outlet; outflow valve actuating means including a pressure sensitive valve actuating element connected to said outflow control valve, said pressure sensitive element being subjected on one side to a relatively low pressure, the other side of said element being subjected to a relatively high operating pressure derived from said source of air under pressure; relay means including a pilot valve controlling the flow of said relatively high pressure air to said other side of said element; a pressure responsive member for controlling said pilot valve; means defining a relay control pressure chamber on one side of said pressure responsive member and a chamber on the opposite side of said member; means defining a bleed for said relay control pressure chamber, said bleed connecting said relay control pressure chamber with said relatively high pressure source, the pressure in said relay control pressure chamber urging the pressure responsive member in the pilot valve closing direction, one chamber on the opposite side of said pressure responsive member being open to enclosure pressure; and pneumatic means for controlling the pressure in said relay control pressure chamber, said pneumatic means being connected with said source of air under pressure.

8. In pressure control mechanism for controlling the pressure in an enclosure: a pressure sensitive element; means defining a pair of pressure chambers on opposite sides of said pressure sensitive element, said chambers being connected by an air bleed, one of said chambers having an outlet to a region of relatively low pressure, the other of said chambers being an operating pressure chamber and having a connection with a source of higher pressure air; means limiting the pressure of the air supplied to said operating pressure chamber; means controlling said operating pressure including a pilot valve controlling the flow of air to said operating pressure chamber; a pressure responsive member for controlling said pilot valve; means defining a pair of pressure chambers on opposite sides of said pressure responsive member; means for connecting one of said chambers with the high pressure air source, said one chamber being a control pressure chamber, the chamber on the opposite side of said pressure responsive member being open to enclosure pressure; means for controlling the pressure in said control pressure chamber, said means being pneumatically connected with said control pressure chamber.

9. In pressure control mechanism for controlling the pressure in an enclosure supplied with air from a source of air under pressure, and having an outlet: an outflow control valve controlling said outlet; outflow valve actuating means including a pressure sensitive valve actuating element connected to said outflow control valve, said pressure sensitive element being subjected on one side to a relatively low pressure, the other side of said element being subjected to a relatively high operating pressure derived from said source of air under pressure; means, including a pilot valve controlling the flow of said relatively high pressure air to said other side of said element; a pressure responsive member for controlling said pilot valve; means defining a control pressure chamber on one side of said pressure responsive member and a chamber on the opposite side of said member; means defining a bleed for said control pressure chamber, said bleed connecting said control pressure chamber with said relatively high pressure source, the pressure in said control pressure chamber urging the pressure responsive member in the pilot valve closing direction, the chamber on the opposite side of said pressure responsive member being open to enclosure pressure; and pneumatic means for controlling the pressure in said control pressure chamber.

References Cited in the file of this patent

UNITED STATES PATENTS

| | | |
|---|---|---|
| 2,510,976 | Herrala et al. | June 13, 1950 |
| 2,562,684 | Wood | July 31, 1951 |
| 2,610,564 | Cooper et al. | Sept. 16, 1952 |

UNITED STATES PATENT OFFICE
CERTIFICATE OF CORRECTION

Patent No. 2,846,934　　　　　　　　　　　　　　　　　　　August 12, 1958

Lloyd F. Mauldin

It is hereby certified that error appears in the printed specification of the above numbered patent requiring correction and that the said Letters Patent should read as corrected below.

Column 6, line 26, for "plot valve" read -- pilot valve --; column 8, line 49, for "one chamber" read -- the chamber --.

Signed and sealed this 21st day of October 1958.

(SEAL)
Attest:

KARL H. AXLINE　　　　　　　　　　　　　　　　　　　　ROBERT C. WATSON
Attesting Officer　　　　　　　　　　　　　　　　　　　Commissioner of Patents